United States Patent [19]

Suminsby

[11] 4,114,436
[45] Sep. 19, 1978

[54] "STRAPDOWN" INDUCTION COMPASS TRANSMITTER WITH COMPENSATION FOR HEADING ERRORS DUE TO THE VERTICAL COMPONENT OF THE EARTH'S MAGNETIC FIELD AND DUE TO TWO CYCLE ERROR DURING TURNS AND DURING CLIMBING AND DIVING MANEUVERS

[76] Inventor: John Edward Suminsby, 65 Arbor St., Wenham, Mass. 01984

[21] Appl. No.: 752,264

[22] Filed: Dec. 20, 1976

[51] Int. Cl.² .................................................. G01C 21/00
[52] U.S. Cl. ...................................... 73/178 R; 33/356; 318/633
[58] Field of Search ................ 33/326, 356, 357, 361; 73/178 R; 235/150.2, 150.25, 150.26, 186; 244/175, 179; 318/629, 633, 647, 654, 661; 340/197, 347 SY

[56] References Cited
U.S. PATENT DOCUMENTS

| 2,852,859 | 9/1958 | Depp | 33/356 X |
| 3,244,961 | 4/1966 | Adler | 318/629 X |
| 3,628,254 | 12/1971 | Burmeister | 33/357 |
| 3,678,593 | 7/1972 | Baker et al. | 33/361 |
| 3,939,572 | 2/1976 | Erspamer | 33/361 |
| 4,006,631 | 2/1977 | Garner | 33/356 X |

Primary Examiner—Stephen G. Kunin

[57] ABSTRACT

The invention relates to an apparatus for compensating a "strapdown" induction compass transmitter to eliminate heading errors during turns and during climbing and diving maneuvers which are due to the vertical component of the Earth's magnetic field and those due to the horizontal component of the Earth's field perpendicular to the axis of tilt. Instabilities and anomalies such as "Northerly Turning Error" which are due to the vertical component of the Earth's magnetic field are thus eliminated or minimized as is two cycle error which is due to the Earth's horizontal field during these same maneuvers. The vertical field roll compensating signal, to compensate for turn induced errors, is made proportional to the product of the Earth's magnetic field M, the sine of the dip angle D, and the sine of the bank or roll angle $\phi$. The vertical field pitch compensating signal, to compensate for errors induced by climbing or diving maneuvers, is made proportional to the product of the sine of the angle $\phi$, the Earth's magnetic field M, and the sine of the dip angle D. The roll compensating signal is combined by summation with the demodulated signals from the sine $\psi$ signal processing channel (i.e., the signal from the compass transmitter windings which sense the field along the athwartships axis. The pitch compensating signal is combined by summation with the demodulated signal from the cos $\psi$ channel (i.e., the signal from the compass transmitter windings which sense the field along the fore/aft axis). Since pitch angle $\theta$ and bank angle $\phi$ (as well as their trigonometric functions sin $\phi$ and sin $\theta$) can be readily obtained from the aircraft vertical (roll and pitch) gyroscopes and dip angle D is known for any latitude and longitude, the compensating signals can be easily generated and applied to the signal processing channel coupled to the output signal processing channels from the compass transmitter to cancel vertical field error. In an alternative embodiment compensation for two cycle error is provided by generating signals proportional to the cosine of the roll angle $\phi$ and the cosine of the pitch angle $\theta$. The two cycle compensating signals are combined with the vertical field error corrected signals from the compass transmitter by multiplication to cancel two cycle error.

5 Claims, 5 Drawing Figures

"STRAPDOWN" INDUCTION COMPASS TRANSMITTER WITH COMPENSATION FOR HEADING ERRORS DUE TO THE VERTICAL COMPONENT OF THE EARTH'S MAGNETIC FIELD AND DUE TO TWO CYCLE ERROR DURING TURNS AND DURING CLIMBING AND DIVING MANEUVERS

The instant invention relates to a magnetic heading reference system and more particularly, to one utilizing a "strapdown" induction compass transmitter which is compensated to minimize or eliminate heading errors during turns, climbs and dives due to vertical field error and two cycle error.

Normally, the heading output for an aircraft compass system is obtained from a directional gyro whose heading is slowly corrected to agree with the heading provided by induction compass transmitter. This type of directional heading output system is complementary in that the short term stability and accuracy of the gyroscope is combined with the long term accuracy of the compass transmitter so that the overall system incorporates the best features of each. One class of induction compass transmitters used as aircraft magnetic references are pendulous in order to assure that the sensing element (i.e., the magnetometer windings) remains horizontal during non-accelerating straight flight within the pendulous tilt freedom of the device (which is normally in the range of ± 27°). Under these conditions the induction compass is insensitive to the vertical component of the Earth's field.

In a typical induction compass transmitter, the horizontal component H of the Earth's magnetic field M is resolved along the ship's axes and can then be sensed and utilized to produce an output signal which represents the heading of the aircraft with respect to magnetic North. Thus, the Earth's horizontal component H can be resolved along the aircraft fore/aft (roll) and athwartships (pitch) axes so that the heading indicated by the compass transmitter is then represented by the arc-tangent of the athwartships component $H_P$ of the Earth's horizontal field divided by the fore/aft component $H_R$ as sensed in the plane of the sensing elements.

However, because of the pendulous suspension, the induction compass transmitter is susceptible to tilt during turns and during linear acceleration of the aircraft. This, in turn, produces errors in the sensed direction of magnetic North and in indicated heading. That is any acceleration due to speed change, or the centripetal acceleration imposed during a turn, causes the plane of the sensing element of the compass transmitter to be displaced from the horizontal. Thus, during a coordinated turn, the pendulous element assumes a lateral tilt angle which agrees with the bank angle of the aircraft; or becomes some other lateral angle if the turn is not coordinated. In the case of acceleration or deceleration due to speed changes, the pendulous element is tilted in a vertical plane so as to simulate the effects of rotation about the pitch axis. Because of the tilting of the plane of the compass transmitter under these conditions, not only is the sensed horizontal component normally reduced, but in addition, a component of the Earth's vertical field is sensed. If the compass is "strapped down," i.e., non pendulous and rigidly secured to the aircraft frame, on the other hand, there is no tilt during acceleration due to speed changes, but the compass also tilts during climbs and dives. The vertical Earth's field component is therefore sensed along the athwartships axis during turns and along the fore/aft axis during climbs or dives. This sensed vertical component adds vectorially to the sensed horizontal field component and, in the general case, results in erroneously sensing of magnetic North.

Tilt of the induction compass sensing element produces errors from a combination of two causes.

The first of these is a two cycle error which is developed whenever there is a component of the Earth's horizontal magnetic field perpendicular to the axis of tilt together with a component along the axis of tilt. The perpendicular component is reduced in magnitude as a function of the angle of tilt when projected on to the plane of the sensing coil. This reduced component when recombined with the unchanged horizontal component measured along the axis of tilt produces an apparent vectorial shift in the sensed direction of the field in the plane of the coil. Two cycle error is a function of both the heading angle $\psi$ and the angle of tilt (bank angle $\phi$ or pitch angle $\theta$). It has the same magnitude for all magnetic field dip angles D and is normally small.

The other tilt induced error occurs because the vertical component of the Earth's magnetic field projects on the plane of the tilted coils and adds vectorially to the sensed horizontal component. This vertical field error, however, varies with magnetic field dip angle D and as a result can vary widely. An angular tilt about the aircraft axis during turns causes this second error source to produce what is termed "Northerly Turning Error" and can induce heading anomalies and ambiguities as well as a continuous oscillation when attempting to straighten out on a northerly heading when in the Northern Hemisphere, and similarly, when attempting to straighten out on a southerly heading in the Southern Hemisphere. The nature of this error which is due to the vertical component of the Earth's magnetic field as the aircraft turns, may be understood better by considering the following.

Assume that an aircraft in a coordinated right turn attempts to level out on a North heading using the induction compass transmitter, whether pendulous or "strapdown," as a reference. The compass transmitter tilts to the same right wing down attitude as does the aircraft. When on a North heading, a portion of the Earth's vertical field vector now passes from West to East in the plane of the compass transmitter, vectorially adding to the actual sensed horizontal component and making it appear that magnetic North is to the East of its actual location. Consequently, the aircraft continues to turn beyond North before levelling off. Once level, North is now correctly indicated to be to the West and the aircraft must to into a left bank for a heading correction. A portion of the Earth's vertical field vector now passes from East to West in the plane of the compass transmitter, vectorially adding to the actual sensed horizontal component in the opposite sense thereby making it appear as if North is to the West of its actual location. Again, the aircraft continues to turn beyond true magnetic North before levelling off. This situation continues making it virtually impossible to obtain or maintain the desired constant North heading.

It is customary, therefore, in conventional slaved aircraft compass systems to interrupt compass slaving during turns in order to avoid the oscillating condition about the northerly heading. This vertical field error often causes the compass mode of operation (available on some compass systems for emergency use when a directional gyro has failed) to become literally useless during turns unless dip angle is relatively small. Since dip angle in the middle of the Continental U.S. is approximately 70°, it can be seen that this is a serious problem in aircraft navigation.

Similar errors are also developed in pendulously mounted compass transmitters during acceleration due to speed changes because the pendulous compass transmitter tilts about the aircraft pitch axis. For most aircraft large tilt angles which are associated with large accelerations are of a relatively short duration so that the problem is normally somewhat less severe than that which occurs during turns of the aircraft. Even so, compass slaving is frequently disconnected on aircraft during acceleration to prevent error buildup. Again, compass mode operation during acceleration may also be severely affected.

A "strapdown" induction compass transmitter, as pointed out previously, is not tilted because of acceleration due to speed changes. It is, however, affected by the Earth's vertical field component while climbing or diving. During a climb, a portion of the Earth's vertical field vector passes from fore to aft in the plane of the compass transmitter, vectorially adding to the actual horizontal component sensed along the fore/aft axis thereby making it appear that magnetic North is to the East of its actual location when heading West in the Northern hemisphere. During a dive, on the other hand, a portion of the Earth's vertical field passes from aft to fore in the plane of the compass transmitter vectorially adding to the actual sensed horizontal component in the opposite sense. As a result, indicated heading shows North to the West of its actual location.

In a recently filed application entitled "A Strapdown Induction Compass Transmitter with Compensation for Heading Errors due to the Vertical Component of the Earth's Magnetic Field During Turns and During Dives or Climbs" Ser. No.: 729,411, Filed: Oct. 4, 1976, in the name of Gerald L. Sullivan, and assigned to the General Electric Company, the assignee of the present invention, a compensating system for a "strapdown" compass transmitter is described in which a control signal equal to the product of the sine of the magnetic field dip angle (sin D) the tilt or bank angle (sin $\phi$) and the Earth's magnetic field (M) is generated and utilized to drive a current directly through the sensing windings of the compass transmitter or through auxiliary windings to generate a flux field which cancels out the sensed flux due to the vertical component of the Earth's field during turns. As a result, the output from the induction compass during a turn is essentially free of errors due to the vertical component of the Earth's magnetic field, thereby minimizing or eliminating hemispherical turn errors of the type usually referred to as "Northerly Turning Errors" during turns. A further control signal equal to the product of the magnetic field angle (sin D), the pitch angle (sin $\theta$) and the Earth's magnetic field M is generated and utilized to drive a current directly through the sensing windings of the compass transmitter which sense the fore/aft component of the Earth's horizontal field or through auxiliary windings to generate a flux field which cancels the sensed flux due to the vertical field during climbs and dives. The output from the induction compass during a climb or during a dive is thus essentially free of errors dur to the vertical component of the Earth's magnetic field, thereby minimizing or eliminating hemispherical turn errors during such maneuvers. This, in turn, makes it possible to use the magnetic compass for heading purposes without the need for a directional gyro.

While the arrangements shown in the aforesaid Sullivan application are very effective in compensating a "strapdown" compass transmitter for errors due to the vertical component of the Earth's magnetic field, both during turns and during climbs and dives, there are some practical problems associated therewith. By applying the compensation current directly to the induction compass transmitter windings or to a separate compensating winding, blocking capacitors must be provided between the compass transmitter and the signal receiver elements leading to the heading indicator or control components of the system. Furthermore, there is also a need for maintaining a high impedance source for the compensation signal in order to avoid scale errors due to loading. The instant invention is based on the recognition that the desired compensation both for a vertical field error and two cycle errors can be achieved by injecting the DC compensation signals into the transmitter sin $\psi$ and cos $\psi$ output channels, i.e., the signal processing channels in which the signals representing the field sensed along the athwartships and the fore/aft axis of the aircraft are processed. By combining the DC compensating signal with a demodulated DC signal, the effects of vertical field error and two cycle error can easily be cancelled. This arrangement avoids problems associated with direct injection of currents into the compass induction transmitter sensing windings or associated compensation windings.

It is therefore a principal objective of the invention to provide an arrangement for compensating a "strapdown" induction compass transmitter to eliminate heading error turns and during climbs and dives caused by the vertical component of the Earth's magnetic field by compensating the demodulated signal from the transmitter in its signal processing channel exterior to the induction compass transmitter. A further objective of the instant invention is to provide a compensated "strapdown" induction compass transmitter in which heading errors caused by tilting of the sensing elements are minimized or reduced entirely.

Still another objective of the invention is to provide a compensated "strapdown" induction compass transmitter in which heading errors in turns and during climbs and dives due to two cycle error are eliminated by compensating demodulated signals from the compass transmitter in a signal processing channel outside of the transmitter.

Yet a further objective of the invention is to provide a compensated magnetic compass heading system having roll and pitch compensation to eliminate vertical field errors and two cycle errors and produce an accurate heading indication without the need for a directional gyroscope, in which compensation is achieved outside of the induction compass transmitter.

Other objectives and advantages of the instant invention will become apparent as the description proceeds.

Briefly, in accordance with one aspect of the invention, roll and pitch compensation of a "strapdown" induction compass transmitter during turns and while climbing and diving is realized through compensation in a signal channel external to the induction compass transmitter. Compensating signals are generated which are proportional to the errors induced by the Earth's vertical field during these maneuvers without sensing the vertical field directly are used to cancel the effect of the Earth's vertical field component. The compensating signals are derived from the Earth's magnetic field M (a known quantity) the magnetic dip angle D (a known quantity for any given latitude and longitude and the tilt angle (roll and pitch) which is a sensed quantity readily obtainable from the aircraft vertical gyroscope. The turn compensating signal has a magnitude M sin D sin $\phi$ which by definition, is equal to V sin $\phi$ the vertical feild error due to tilting of the compass transmitter windings during turns. This DC compensating signal is combined with the demodulated signal from the sin $\psi$ (heading) output channel, i.e., the signal representing the output from those windings which sense the Earth's magnetic field along the athwartships axis. The compensating signal for vertical field error during climbs or dives has a magnitude equal to M sin D sin $\theta$ which, by definition, is equal to V sin $\theta$ (the vertical field error in climbs and dives). This DC compensating signal for vertical field errors during climbs and dives is combined with the demodulated signal from the cos $\psi$ output channel of the compass transmitter, i.e., the output from those windings of the compass transmitter which sense the Earth's magnetic field along the fore/aft axis of the vehicle. Thus, errors introduced during climbing or diving due to a vertical component of the Earth's field are eliminated eliminating instabilities such as "Northerly Turning Errors" during these maneuvers. The compensated, demodulated, DC compass transmitter signals may then be remodulated in any suitable fashion to provide a suitable output signal for a heading indicating or a control system.

In an alternative embodiment, the compensated, demodulated signal in both the sin $\psi$ and cos $\psi$ channels may be processed further to compensate for two cycle errors by introducing DC signals proportional to the cosine the cos of the roll and pitch angles (cos $\phi$, cos $\theta$). The two cycle error compensating signals are combined, with the signal which has been previously compensated for vertical field errors. The twice compensated signal is free of two cycle error and free of errors due to the vertical component of the Earth's magnetic field.

The novel features which are characteristic of this invention are set forth with particularity in the appended claims. The invention itself, however, both as to its organization and mode of operation, together with further objectives and advantages thereof, may best be understood by reference to the following description taken in connection with the accompanying drawings in which:

Figure 1:
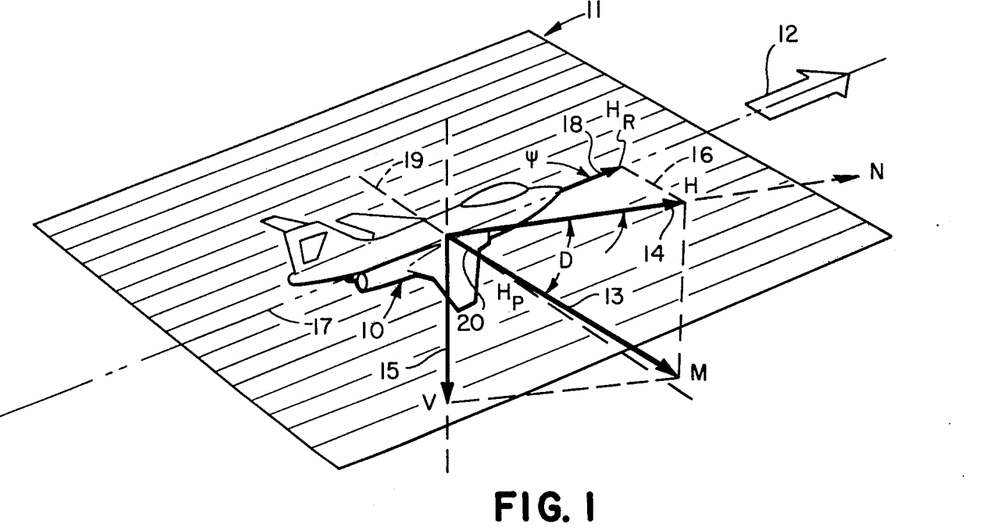
FIG. 1 is a perspective depiction of an aircraft during level flight in the horizontal plane and shows the relationship between the Earth's magnetic field M, the magnetic dip angle D, and the sensed magnetic field along the aircraft axes.

In order to understand the manner in which the instant invention is used to compensate a "strapdown" induction compass transmitter to reduce or eliminate heading errors caused by the vertical component of the Earth's magnetic field, it will be revealing to discuss initially the relationship between the Earth's magnetic field and the magnetic field components sensed by a "strapdown" induction compass both in level flight, during level turns, and during climbs and dives when tilting of the aircraft axes and of the compass transmitter produces changes in the sensed field. Thus, FIG. 1 illustrates an aircraft 10 in level flight in a horizontal plane (illustrated generally at 11) in a direction shown by the arrow 12 which in the particular instance, is the direction of the aircraft with respect to the North directed horizontal domponent H of the Earth's magnetic field M. The Earth's magnetic field M is a vector quantity shown at 13 consisting of a North directed horizontal component H shown at 14 and a vertical component V shown at 15. The angle measured from the horizontal component H to the Earth's magnetic field vector M is termed the dip angle D, with the dip angle being considered positive when the Earth's magnetic field dips below the horizontal, as it does in the Northern Hemisphere. Consequently, the vertical component of the Earth's magnetic field is considered positive when directed downward. The direction of the Earth's magnetic field M, i.e., the dip angle D varies with latitude with the dip angle being zero (0°) at the magnetic equator and becoming 90° at the North magnetic pole. The analytical relationship between the Earth's magnetic field and the horizontal and vertical components of that field are therefore as follows:

$$H = M \cos D \tag{1}$$

$$V = M \sin D \tag{2}$$

$$\text{Tan } D = V/H \tag{3}$$

Aircraft magnetic heading is defined as a horizontal angle $\psi$ (positive in a clockwise direction from magnetic North) shown generally at 16, between the horizontal projection of the aircraft fore/aft or roll axis shown at 17, and magnetic north. The horizontal component of the Earth's magnetic field may, in turn, be resolved along the aircraft axes into two orthogonal horizontal components $H_R$ and $H_P$ which are functions of magnetic heading angle $\psi$. $H_R$ is a component parallel to the horizontal projection 17 of the aircraft fore/aft or roll axis and is shown by the arrow 18 and is considered positive when directed forward, as illustrated. $H_P$ is a component parallel to the horizontal projection 19 of the aircraft athwartships or pitch axis. $H_P$ is shown by the arrow 20 and is considered positive when directed to port. With the westerly heading shown in FIG. 1, the sensed athwartships component 20 is directed to starboard and is therefore considered to be negative.

The analytical relationships between the orthogonal components $H_R$ and $H_P$ along the aircraft axes, the heading angle $\psi$ and the horizontal component H of the Earth's magnetic field may be defined as follows:

$\psi$ = actual magnetic heading
$$H_p = H \sin \psi \qquad (4)$$

$$H_R = H \cos \psi \qquad (5)$$

$$\text{Tan } \psi = (H_p/H_R) \qquad (6)$$

The heading indicated by an induction compass transmitter which has a plurality of windings to sense the athwartships and the fore/aft component of the horizontal component of the Earth's magnetic field may generally be represented by the arc tangent of the athwartships (positive to port) component A of the Earth's magnetic field divided by the fore/aft (positive forward) component F of the Earth's field as sensed in the plane of the coils or windings of the compass transmitter. When the aircraft is in level flight in the horizontal plane as shown in FIG. 1, the two orthogonal components of the horizontal field H are sensed accurately and produce an accurate magnetic heading indication. Furthermore, with the aircraft in level flight, the vertical component V of the Earth's field as illustrated at 15 is not sensed in the plane of the compass transmitter sensing windings and has no effect on the magnetic output heading.

Figure 2:
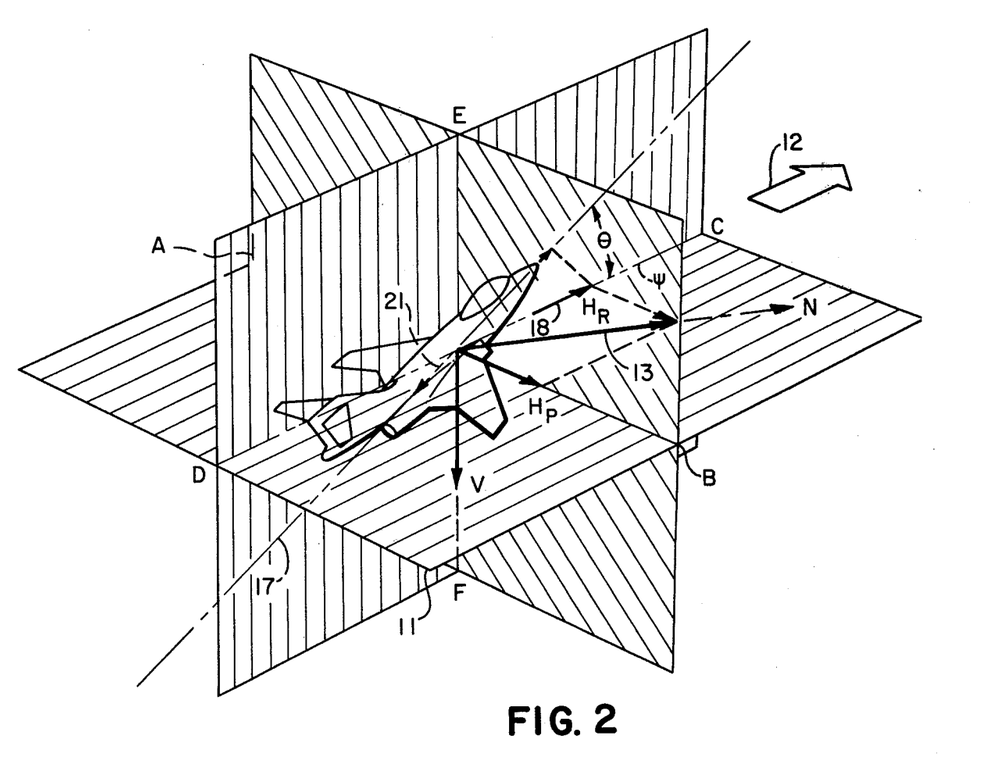
FIG. 2 is a perspective depiction of the aircraft during climbs showing the effect of the climb and the relationship of the magnetic field components sensed by a compass transmitter, the aircraft axes and the Earth's magnetic field.

With a "strapdown" induction compass transmitter, the transmitter, of course, is rigidly fastened to the frame of the aircraft. The plane of the transmitter sensing windings therefore tilts with the aircraft. That is, with a "strapdown" compass transmitter, the plane of the transmitter is tilted in a vertical plane as the aircraft rotates about its pitch axis while climbing or diving and is rotated about the roll axis and tilts to the aircraft bank angle as the aircraft goes into rotation about its pitch axis as in the case of a climb or a dive, is illustrated in perspective in FIG. 2. The aircraft 10 is still flying with a westerly heading with respect to magnetic North N as shown by the arrow 12. The aircraft is shown as having been rotated about its pitch axis so as to be in a climbing attitude. That is, aircraft 10 is shown with its fore/aft axis 17 rotated through an angle $\theta$ in the plane DECF so that it is no longer in level flight in the horizontal plane ACBD. The fore/aft component $H_R$ of the horizontal field component H of the Earth's magnetic field, which is shown at 18, is sensed by the induction compass transmitter which has also been rotated through the angle $\theta$. The sensed fore/aft component is reduced as a function of the cos $\theta$. The fore/aft component due to the horizontal component of the Earth's field is thus:

$$F_{\theta H} = H_R \cos \theta \qquad (7)$$

With the compass transmitter tilted to the pitch angle $\theta$, it can be seen that the Earth's vertical field component is no longer perpendicular to the plane of the sensing windings and a component of the Earth's field, shown at 21, is sensed along the fore/aft axis 17 of the aircraft and is equal to V sin $\theta$. In a climb the vertical field component is directed rearward and thus negative in the Northern Hemisphere, as illustrated.

Thus, $F_{\theta V} = -V \sin \theta$. The total fore/aft component sensed in the tilted plane of the compass transmitter for a positive (climb) pitch angle $\theta$ is therefore:

$$F_\theta = F_{\theta H} + F_{\theta V} = H_R \cos \theta - V \sin \theta \qquad (8)$$

$$F_\theta = H \cos \psi \cos \theta - V \sin \theta \qquad (9)$$

The athwartships component A sensed by the compass transmitter is not affected by the vertical component of the Earth's field during a climb (or dive) and remains:

$$A_\theta = H_p \sin \psi \qquad (10)$$

If the aircraft also goes into a turn rotates through a bank angle $\phi$ the vertical component of the Earth's field is no longer perpendicular to the plane of the compass transmitter windings which measure the athwartships axis and a component of the vertical field is sensed which is proportional both to the roll or bank angle $\phi$ as well as to the pitch angle $\phi$. A component of the horizontal field along the fore/aft axis is sensed along the athwartships axis. The following relationships fully define F and A in terms of $H_R$, $H_P$, $\phi$, $\theta$ and V for a "strapdown" induction compass transmitter during non-level turns:

$$F = H_R \cos \theta - V \sin \theta \qquad (11)$$

$$A = -H_R \sin \phi \sin \theta + H_p \cos \phi - V \sin \phi \cos \theta \qquad (12)$$

Equation (12) may be rewritten in terms of H, V, $\theta$ and $\phi$ as follows:

$$F = H \cos \psi \cos \theta - V \sin \theta \qquad (13)$$

$$A = -H \cos \psi \sin \phi \sin \theta + H \sin \psi \cos \phi - V \sin \phi \cos \theta \qquad (14)$$

Using the subscript $\phi$ to designate F, A and $\psi$ during a level turn, i.e., $\theta = 0$ then the field sensed by a "strapdown" transmitter is defined by the following equations:

$$F_\phi = H \cos \psi \qquad (15)$$

$$A_\phi = H \sin \psi \cos \phi - V \sin \phi \qquad (16)$$

$$\text{Tan } \psi_\phi = \frac{A_\phi}{F_\phi} = \frac{H \sin \psi \cos \phi - V \sin \phi}{H \cos \psi} \qquad (17)$$

$$\text{Tan}\psi\phi = \text{Tan}\psi\cos\phi - (V\sin\phi/H\cos\psi) \qquad (18)$$

But V/H — Tan D
Hence:

$$\text{Tan } \psi_\phi = \tan \psi \cos \phi - \frac{\text{Tan } D \sin \phi}{\cos \psi} \qquad (19)$$

$\psi$

The first expression on the right hand side, tan $\psi$ cos $\phi$ represents the two cycle error in that it is a function of both the heading angle $\psi$ and the bank or roll angle $\phi$. The second expression on the right hand side represents the vertical field error and is a function of the dip angle D, i.e., vertical field error = tan D (sin $\phi$/cos $\psi$).

Since dip angle varies with latitude from zero (0°) at the equator to 90° at the magnetic north pole, this vertical field error can vary substantially and produce heading errors which manifest themselves as turning problems. These problems, generally referred to as "Northerly Turning Errors," include heading anomalies and ambiguities if the bank angle equals or exceeds a critical value and results in oscillations about the desired heading if the bank angle is below the critical value. Briefly, if the bank angle exceeds the complement of the dip angle, it is not possible to find and indicate all headings since the compass transmitter will then only indicate headings in a limited range no matter what the actual heading is. The problem is at its most severe when attempting a turn while on a direct East ((9°) or West (270°) heading. On such an East or West heading, if the bank angle exceeds the complement of the dip angle, there can be a complete reversal of the heading indication. Thus, on an East (90°) heading, a right wing down turn in which the bank angle exceeds the complement of the dip angle, causes the compass transmitter indication to reverse 180° and indicate a West (270°) heading. Similarly, while on a West (270°) heading a left wing down turn in which the bank angle exceeds the complement of the dip angle causes the compass transmitter to indicate an East (90°) heading.

If the bank angle is exactly equal to the complement of the dip angle then the output of the compass transmitter becomes indeterminate on these headings since it no longer senses any magnetic field and all heading indication is lost. The manner in which these anomalies and ambiguities occur when the bank angle equals or exceeds the critical angle (i.e., the complement of the dip angle) will be illustrated in connection with an aircraft on an East or West heading since this represents a "worst case" situation.

For an East and West heading, the sensed for/aft component F of the Earth's horizontal field obviously goes to zero, i.e., $F_\phi = 0$. For an East heading (East = 90°) the value of the sin of heading angle, i.e., $\sin \psi = \sin 90° = +1$. For a West heading (West = 270°) $\sin \psi = \sin 270° = -1$. Thus, on an East heading the sensed athwartships component $A_{100}$, as defined in Equation (16) becomes zero, when $V \sin \phi = H \sin \psi \cos \phi$; i.e., when the vertical field error equals and is in an opposite direction to the sensed horizontal component.

Since sin = +1 for an East heading, $A_\phi = 0$ when:

$$V \sin \phi = H \cos \phi \quad (20)$$

Transposing Equation (20) becomes $$H/V = (\sin \phi / \cos \phi) \quad (21)$$

By trigonometric transformation, Equation (21) becomes:

$$(H/V) = \tan \phi \quad (22)$$

However, since $(H/V) = \cot D$ then $\cot D = \tan \phi$. But $\cot D = \tan (90° - D)$ Therefore, $\tan \phi = \tan (90° - D) \quad (23)$ or $\phi = 90° - D. \quad (24)$ In other words, for a given dip angle the induction compass transmitter heading becomes indeterminate in an East heading in the Northern Hemisphere when the bank angle is to the right and is equal to the complement of the dip angle. If $\phi > 90 - D$ then the indicated heading actually reverses 180°.

In a similar fashion, for a West heading with $\sin \psi = -1$, then $$\tan \phi = -(H/V) = -\cot D = -\tan (90°) = \tan -(90° - D)$$

or $$\phi = -(90° - D)$$

In summary, in the Northern Hemisphere, indicated headings become indeterminate when flying East with a right (positive) bank angle equal to the complement of the dip angle or when flying West with a left (negative) bank angle equal to the complement of the dip angle. Increasing the bank angle so that it exceeds the complement of the dip angle results in a reversal of the polarity of the athwartships component $A_\phi$ and produces 180° error in indicated heading for the above conditions. Consequently, the indicating heading appears to modulate around West (270°) during a right turn, and to modulate around East (90°) during a left turn. This results in not being able to turn to indicated headings near North or South without first levelling down to a bank angle which is lower than the complement of the dip angle. For the mideastern U.S., where dip angle is +70°, the bank angles must therefore be less than ±20° to avoid this problem on the East/West heading.

For headings other than East or West any turns in which the bank angle exceeds the complement of the dip angle, the compass transmitter will indicate only a limited and erroneous range of headings. The nature of the problem may be discerned from Tables I and II which tabulate the indicated heading vis-a-vis the actual heading in case of Table I and the magnitude and direction of the heading error in Table II for bank angles of ±15° (below the critical angle) and ±30° (above the critical angle) for a dip angle D = +70° which represents a dip angle typical of the Eastern United States.

TABLE I

| Actual Hdg (°) | INDICATED HEADING (DEG) | | | |
|---|---|---|---|---|
| | +15° Bank | +15° Bank | +30° Bank | −30° Bank |
| 0 | 324.58 | 35.42 | 306.05 | 53.95 |
| 45 | 357.73 | 63.11 | 312.88 | 70.40 |
| 90 | 90.00 | 90.00 | 270.00 | 90.00 |
| 135 | 182.27 | 116.89 | 227.12 | 109.60 |
| 180 | 215.42 | 144.58 | 233.95 | 126.05 |
| 225 | 243.11 | 177.73 | 250.40 | 132.88 |
| 270 | 270.00 | 270.00 | 270.00 | 90.00 |
| 315 | 296.89 | 2.27 | 289.60 | 47.12 |

TABLE II

| Actual Hdg (°) | INDICATED HEADING ERROR (DEG) | | | |
|---|---|---|---|---|
| | +15° Bank | −15° Bank | +30° Bank | −30° Bank |
| 0 | −35.42 | 35.42 | −53.95 | 53.95 |
| 45 | −47.27 | 18.11 | −92.12 | 25.40 |
| 90 | 0.00 | 0.00 | +180.00 | 0.00 |
| 135 | 47.27 | −18.11 | 92.12 | −25.40 |
| 180 | 35.42 | 35.42 | 53.95 | −53.95 |
| 225 | 18.11 | −47.27 | 25.40 | −92.12 |
| 270 | 0.00 | 0.00 | 0.00 | ±180.00 |
| 315 | −18.11 | 47.27 | −25.40 | 92.12 |

As may be seen from Table I for a right wing down turn where the bank angle is in excess of the complement of the dip angle (i.e., +30°) the compass transmitter indications are limited to the range from 227° to 312°. Thus, for any actual heading from 0° to 360° the indicated headings from the compass transmitter vary over a limited (and mostly erroneous) range; i.e., limited range, roughly between a South-West (225°) and Northwest (315°) heading. Similarly, for a left wing down turn (i.e., −30°) the compass transmitter indications are limited to the range from 47° to 132°. The indicated headings in this instance are limited to a range roughly between North-East (+45°) to South-East (135°) even though the actual headings may vary through 360°. Thus, it can be seen that due to vertical field error, serious ambiguities and anomalies exist on all indicated headings from a compass transmitter when in a turn in which the bank angle exceeds the complement of the dip angle.

The indicated headings and heading errors shown in Tables I and II have values characteristic of the exemplary dip and bank angles described in connection therewith (i.e., $D = +70 = \pm 15$ and $\phi \pm 30°$). Obviously for different combinations of dip angles and bank angles, the actual indicated heading and heading error values will vary with actual dip and bank angles but the "Northerly Turning Error" ambiguities and anomalies of the type just described exist to varying degrees as long as the bank angle equals or exceeds the complement of the dip angle.

In addition to the "Northerly Turning Error" anomalies and ambiguities which occur during a turn when the bank angle equals or exceeds the complement of the dip angle, "Northerly Turning Error" also results in continuous oscillations about a desired heading when attempting to straighten out on a northerly heading in the Northern Hemisphere even though the bank angle is less than the complement of the bank angle. Again, it must be stressed that the term "Northerly Turning Error" is somewhat of a misnomer as it is really a hemispherical turning error produced during turns by the Earth's vertical field and is by no means limited to the Northern Hemisphere since the same problem exists in the Southern Hemisphere when attempting to straighten out a Southerly heading.

The nature of this oscillatory "Northern Turning Error" can also be illustrated by reference to Table I. Let it be assumed that the system is being operated in the compass mode, i.e., not slaved to a directional gyro. For a +15° bank [i.e., a right hand turn towards North with a bank angle less than the complement of the dip angle], the plane must turn to an actual heading of approximately 45° for the compass to have an indicated heading of approximately 0° (i.e., 357.73°). Upon levelling out, however, the compass indicates the actual heading is 45° to the East of true magnetic North. This informs the pilot that a left bank turn is needed to obtain a North heading. During a subsequent −15° bank, the aircraft turns to an actual heading of approximately 315° because at that heading the indicated for a −15° bank is approximately 0° (i.e., 2.27°). Upon levelling out, the now correct indication of 315° will inform the pilot that he is now to the West of magnetic North and that a right bank turn is needed to obtain a North heading. Thus, an oscillatory condition exists which makes it very difficult to turn to and level out on a North heading in turns where the bank angle is less than the complement of the dip angle.

The oscillatory condition which exists as the pilot tries to turn to a northerly heading in the Northern Hemisphere is not present when turning to a southerly heading in the Northern Hemisphere. That is, the data from Table I makes it clear that this oscillatory or overshoot instability does not exist since for a southerly heading the compass indicator will show 180° before that heading is actually reached. That is, while trying to turn to a southerly heading in a Northern Hemisphere, the error introduced by the vertical component of the Earth's field causes an undershoot rather than an overshoot. As a result, although the compass transmitter gives erroneous indications which introduce some difficulties, the fact that the error results in undershoot allows the pilot, by continuing to bank, to reach the southerly heading in the Northern Hemisphere.

As has been shown previously by Equation (16) the vertical field error along the athwartships axis during a turn is $-V \sin \phi$. As a result, the indicated heading which is represented by the arc tangent of the athwartships component $A_\phi$ divided by the fore/aft component $F_{100}$, has an error term which is proportional to Tan D, i.e., the tangent of the dip angle. Since magnetic dip angle D varies substantially with latitude, substantial errors in indicated heading, as shown in Table I and II are present in "Northerly Turning Error."

Applicant has found that the vertical field error can be substantially eliminated by adding a compensating signal to the compass transmitter in the form of a varying D.C. compensation signal which cancels out the vertical field error.

The Earth's vertical magnetic field component is defined as $V = M \sin D$, where M is the Earth's magnetic field and D is the dip angle. The vertical field error, $-V \sin \phi$ is therefore equal to:

$$-V \sin \phi = -M \sin D \sin \phi \quad (25)$$

Thus, by adding a signal equal to $M \sin D \sin \phi$ to the athwartships component $A_\phi$, $A_\phi$ is modified to become $A_{\phi C}$.

This compensated signal $A_{\phi C}$ is then equal to:

$$A_{\phi C} = (H \sin \psi \cos \phi - V \sin \phi) + M \sin D \sin \phi \quad (26)$$

$$A_{\phi C} = H \sin \psi \cos \phi \quad (27)$$

Substituting Equation (27) which is the magnetic heading in Equation (17), the tan of $\psi_\phi$ becomes:

$$\text{Tan } \psi_{\phi C} = \text{Tan } \psi \cos \phi \quad (28)$$

It can be seen from Equation (28) that the compensated indicated heading only contains a two cycle error proportional to $\psi$ and $\phi$. This error is relatively small and does not vary with latitude. As a result, there is no error due to the Earth's vertical field component and "Northerly Turning Error" is eliminated.

Table III, below shows the indicating heading error for various bank angles and a dip angle of +70° with the introduction of a compensating signal equal to $M \sin D \sin \phi$:

TABLE III

TURN COMPENSATED INDICATED HEADING ERROR (°)

| Actual Hdg (°) | +15° Bank | −15° Bank | +30° Bank | −30° Bank |
|---|---|---|---|---|
| 0 | 0.00 | 0.00 | 0.00 | 0.00 |
| 45 | −0.99 | −0.99 | −4.11 | −4.11 |
| 90 | 0.00 | 0.00 | 0.00 | 0.00 |
| 135 | 0.99 | 0.99 | 4.11 | 4.11 |
| 180 | 0.00 | 0.00 | 0.00 | 0.00 |
| 225 | −0.99 | −0.99 | −4.11 | −4.11 |
| 270 | 0.00 | 0.00 | 0.00 | 0.00 |
| 315 | 0.99 | 0.99 | 4.11 | 4.11 |

As may be seen from Table III, by eliminating the vertical field errors during a turn, the only errors still present in the output of the induction compass transmitter are those due to two cycle error. However, as pointed out previously, two cycle errors tend to be relatively small and do not have the major effects that vertical field errors do. It will be apparent therefore that by providing a compensating signal which is equal to M sin D sin $\phi$, that the overall errors produced by a "strapdown" induction compass transmitter are reduced substantially and "Northerly Turning Error" has been effectively eliminated.

Compensation of a "strapdown" induction compass transmitter for tilt about the pitch axis while climbing or diving during straight flight, i.e., no rotation about the roll axis, may be similarly achieved. That is, in a climb or a dive during straight flight, the bank or roll angle $\phi = 0 = $ aircraft pitch angle relative to the horizontal. For this condition, using the subscript $\theta$ for the the sensed fore/aft and athwartships components during a climb or dive, $F_\theta$ and $A_\theta$ may be defined as follows:

$$F_\theta = H \cos \psi \cos \theta - V \sin \theta \quad (29)$$

$$A_\theta H = \sin \psi \quad (30)$$

It will be apparent from Equations (29) and (30) that in a straight climb or a dive (where the bank angle $\phi = 0$) the sensed athwartships component $A_\theta$ is not affected by the Earth's vertical field component V but the sensed fore/aft component is. As pointed out previously, the arc tangent of, the indicated compass transmitter heading then becomes $\rho$.

$$\text{Tan } \psi_\theta = \frac{A_\theta}{F_\theta} = \frac{H \sin \psi}{H \cos \psi \cos \theta - V \sin \theta} \quad (31)$$

$$\text{Tan } \psi_\theta = \frac{\frac{H \sin \psi}{H \cos \psi}}{\frac{H \cos \psi \cos \theta}{H \cos \psi} - \frac{V \sin \theta}{H \cos \psi}} \quad (32)$$

$$= \frac{\text{Tan } \psi}{\cos \theta - \frac{V}{H} \frac{\sin \theta}{\cos \psi}}$$

$$\text{Tan } \psi_\theta = \frac{\text{Tan } \psi}{\cos \theta - \frac{\text{Tan } D \sin \theta}{\cos \psi}} \quad (33)$$

From Equation (33) it is apparent that again, there is a two cycle error and a vertical field error $$\left( \frac{\text{Tan } D \sin \theta}{\cos \psi} \right)$$

which varies with dip angle and can introduce various heading anomalies. The heading anomalies during climbs and dives are similar in nature to those introduced during a turn but occur on different headings. These heading anomalies and ambiguities occur if the pitch angle during a climb or dive equals or exceeda a critical value. Briefly, if the pitch angle exceeds the complement of the dip angle, it is not possible to find and indicate all headings since the compass transmitter will then ohn only indicate headings in a limited range no matter what the actual heading is. The problem is at its most severe when on a direct North (0°) or South (180°) heading. On such a North or South heading, if the bank angle exceeds the complement of the dip angle, there can be a complete reversal of the heading indication. Thus, on a North (0°) heading, a positive pitch angle (i.e., a climb) which exceeds the complement of the dip angle, causes the compass transmitter indication to reverse 180° and indicate a South (180°) heading. Similarly, while on a South (180°) heading a negative pitch angle (i.e., a dive) which exceeds the complement of the dip angle causes the compass transmitter to indicate a North (0°) heading.

If the pitch angle is exactly equal to the complement of the dip angle then the output of the compass transmitter becomes indeterminate on these headings since it no longer senses any magnetic field and all heading indication is lost.

The manner in which these anomalies and ambiguities occur when the pitch angle equals or exceeds the critical angle (i.e., the complement of the dip angle) will be illustrated in connection with an aircraft on a North or South heading since this represents a "worst case" situation.

For a North and South heading, the sensed athwartships component A of the Earth's horizontal field obviously goes to zero, i.e., $A_\theta = 0$. For a North heading (North = 0°) the value of the cos of the heading angle i.e., $\cos\psi = \cos 0° = +1$. For a South heading (180°) $\cos \psi = \cos 180° = -1$. Thus, on a North heading, the fore/aft component $F_\phi$ as defined in Equation (29) becomes zero when $V \sin \theta = H \cos \psi \cos \theta$.

Since $\cos \mu = +1$ for a North heading, $F_\theta = 0$ when $$V \sin \theta = H \cos \theta \quad (34)$$

Transposing, Equation (34) becomes $$H/V = (\sin \theta / \cos \theta) \quad (35)$$

By trigonometric transformation, Equation (35) becomes:

$$(H/V) = \text{Tan } \theta \quad (36)$$

However, since (H/V) = COT D then COT D = Tan $\theta$. But COT D = Tan (90° − D)
Therefore,
$$\text{Tan } \theta = \text{Tan } (90° - D) \quad (37)$$

or
$$\theta = 90° - D \quad (38)$$

In other words, for a given dip angle the induction compass transmitter heading becomes indeterminate in a North heading in the Northern Hemisphere when the aircraft is in a climb and the pitch angle $\theta$ is equal to the complement of the dip angle. If $\theta > 90 - D$ then the indicated heading actually reverses 180°.

In a similar fashion, for a South heading with $\cos \psi = -1$, then $$\text{Tan } \theta = 1 \text{ H/V} = - \text{COT D} = - \text{Tan}(90° - D) = $$
$$\text{Tan} - (90° - D) \quad (39)$$

or
$$\theta = - (90° - D)$$

In summary in the Northern Hemisphere, indicated headings become indeterminate when flying North and climbing with a pitch angle (positive) equal to the complement of the dip angle or when flying South and diving with a pitch angle (negative) equal to the complement of the dip angle. Increasing the pitch angle so that it exceeds the complement of the dip angle results in a reversal of the polarity of the fore/aft component $F_\theta$ and produces 180° error in indicated heading for the above conditions. Consequently, the indicated heading appears to modulate around South (180°) during a climb and North (0°) during a dive. This results in not being able to obtain a heading indication without first levelling down to a pitch angle which is lower than the complement of the dip angle. For the mideastern U.S., where the dip angle is approximately +70°, the pitch angle for climbs and dives must therefore be less than ±20° to avoid this problem on a North or South heading.

In addition to the problems encountered during dives and climbs when on a North or South heading, other anomalies exist at other headings. Table IV (below) shows indicated headings and Table V below shows indicating heading errors for exemplary pitch angle values of ±15° and ±30° for a dip angle of 70°.

TABLE IV

| Actual Hdg (Dg) | INDICATED HEADING (DEG) | | | |
|---|---|---|---|---|
| | +15° Pitch | −15° Pitch | +30° Pitch | −30° Pitch |
| 0 | 0.00 | 0.00 | 180.00 | 0.00 |
| 45 | 92.27 | 26.89 | 137.12 | 19.60 |
| 90 | 125.42 | 54.58 | 143.95 | 36.05 |
| 135 | 153.11 | 87.73 | 160.40 | 42.88 |
| 180 | 180.00 | 180.00 | 180.00 | 0.00 |
| 225 | 206.89 | 272.27 | 199.60 | 317.12 |
| 270 | 234.58 | 305.42 | 216.05 | 323.95 |
| 315 | 267.73 | 333.11 | 222.88 | 340.40 |

TABLE V

| Actual Hdg (°) | INDICATED HEADING ERROR (°) | | | |
|---|---|---|---|---|
| | +15° Pitch | −15° Pitch | +30° Pitch | −30° Pitch |
| 0 | 0.00 | 0.00 | +180.00 | 0.00 |
| 45 | 47.27 | −18.11 | 92.12 | −25.40 |
| 90 | 35.42 | −35.42 | 53.95 | −53.95 |
| 135 | 18.11 | −47.27 | 25.40 | −92.12 |
| 180 | 0.00 | 0.00 | 0.00 | +180.00 |
| 225 | −18.11 | 47.27 | −25.40 | 93.12 |
| 270 | −35.42 | 35.42 | −53.95 | 53.95 |
| 315 | −47.27 | 18.11 | −92.12 | 25.40 |

It can be seen from Table V that for a positive pitch angle (climb) in excess of the complement of the dip angles (i.e., +30°, the compass transmitter indicated headings are limited to the range ∼137° to 222°. Similarly, for a negative pitch angle (dive) in excess of the complement of the dip angle (i.e., −30°), the indicated headings are limited to the range 317° to 43°. This obviously introduces severe heading indication errors when in a climbing or a diving maneuver with the pitch angle exceeding the complement of the dip angle.

Applicant has found that the vertical field error can be substantially eliminated during climbs and dives by adding a DC compensating signal to the compass transmitter which cancels the effect of the Earth's vertical field on the compass sensing windings. The Earth's vertical field V is defined as V = M sin D, where M is the Earth's magnetic field and D is the dip angle. Vertical field error $-V \sin \theta$ therefore is equal to:

$$-V \sin \theta = -m \sin D \sin \theta \quad (40)$$

Thus, by adding a signal equal to M sin D sin θ the fore/aft component $F_\theta$, $F_\theta$ is modified to become $F_{\theta C}$. The compensated fore/aft component $F_{\theta C}$ is therefore defined as:

$$F_{\theta C} = (H \cos \psi \cos \theta - V \sin \theta) + M \sin D \sin \theta \quad (41)$$

Hence, $$F_{\theta C} = H \cos \psi \cos \theta \quad (42)$$

As a result, the arc tangent of ψ becomes:

$$\text{Tan } \psi_{\theta C} = \frac{A_\theta}{F_{\theta C}} = \frac{H \sin \psi}{H \cos \psi \cos \theta} = \frac{\text{Tan } \psi}{\cos \theta} \quad (43)$$

It will be apparent from Equation (43) that the compensated indicated heading only contains a two cycle error.

By adding such a compensating signal, the indicated heading error for various bank angles at a dip angle of +70° is reduced substantially as may be seen from Table VI below:

TABLE VI

| Actual Hdg (°) | PITCH COMPENSATED INDICATED HEADING ERROR (DEG) | | | |
|---|---|---|---|---|
| | +15° Pitch | −15° Pitch | +30° Pitch | −30° Pitch |
| 0 | 0.00 | 0.00 | 0.00 | 0.00 |
| 45 | 0.99 | 0.99 | 4.11 | 4.11 |
| 90 | 0.00 | 0.00 | 0.00 | 0.00 |
| 135 | −0.99 | −0.99 | −4.11 | −4.11 |
| 180 | 0.00 | 0.00 | 0.00 | 0.00 |
| 225 | 0.99 | 0.99 | 4.11 | 4.11 |
| 270 | 0.00 | 0.00 | 0.00 | 0.00 |
| 315 | −0.99 | −0.99 | −4.11 | −4.11 |

Table VI shows that by eliminating vertical field errors, the only errors in the output of the induction compass transmitter are those due to two cycle error. However, as may be seen from this tabulation, these errors tend to be relatively small and do not have the major effects on the heading indication that vertical field errors do. It will be apparent therefore that the overall errors produced in the output of a "strapdown" induction compass transmitter during climbs and dives are reduced substantially along with the anomalies and ambiguities associated with this condition.

Although two cycle error is relatively small since it does not vary with latitude, there may be occasions when there is a need to eliminate even this relatively minor source of heading error. This may be achieved by processing the athwartships and fore/aft signals $A_{\phi C}$ and $F_{\theta C}$ which have been compensated for errors due to the Earth's vertical field component by modifying the corrected signal (by multiplying) to cancel the cos φ and cos θ terms.

$A_{\phi C}$ is modified to become $A_{\phi CC}$ in the following fashion:

$$A_{\phi CC} = A_{\phi C} \cdot (1/\cos) \phi; A_{\phi C} = H \sin \psi \cos \phi \quad (44)$$

$$\therefore A_{\phi CC} = \sin \psi \cos \phi \cdot (1/\cos) \phi = H \sin \psi \quad (45)$$

As a result the arc tangent $_{\phi C}$ according to Equation (28) becomes:

$$\text{Tan } \psi_{\phi CC} = (H \sin\psi/H \cos\psi) = \text{Tan } \psi \quad (46)$$

Similarly:

$F_{\theta C}$ according to Equation (42) becomes $$F_{\theta CC} = F_{\theta C} \cdot (1/\cos) \theta; F_{\theta C} = H \cos \psi \cos \theta \quad (47)$$

$$\therefore F_{\theta CC} = H \cos \psi \cos \theta = \cdot (1/\cos) = H \cos \psi \quad (48)$$

As a result, the arc tangent of $\psi_{\theta C}$ according to Equation (43)
becomes:

$$\text{Tan}_{\theta CC} = \frac{H \sin \psi}{H \cos \psi} = \text{Tan } \psi \quad (49)$$

As will be described in detail later, cancellation of the two cycle error terms cos $\phi$ and cos $\theta$ may be most readily achieved by multiplying the DC negative feedback signal in the null balancing, demodulating networks for the respective output signals from the induction compass transmitter windings by the compensating signals cos $\phi$ and cos $\theta$.

Figure 3:
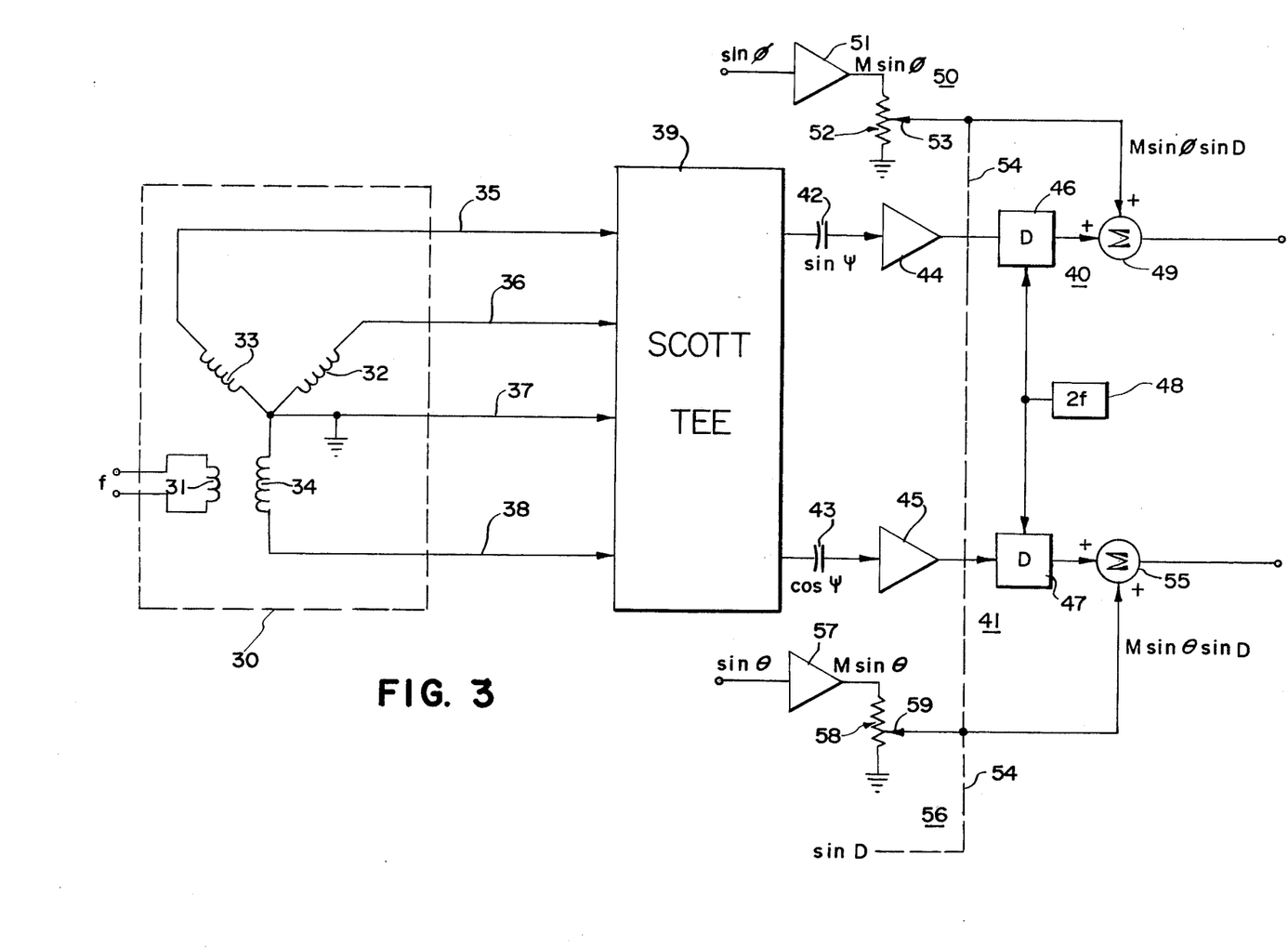
FIG. 3 is a schematic illustration of an arrangement for compensating a "strapdown" compass transmitter of the synchro type by processing a demodulated output signal from the transmitter in an external signal processing channel.

FIG. 3 illustrates one embodiment of an arrangement for compensating the output of a "strapdown" induction transmitter of the synchro type for errors due to the vertical component of the Earth's field both during turns and during climbs or dives. The system of FIG. 3 involves the developing of a DC compensating signal of magnitude M sin D sin $\phi$ and combining this signal with the demodulated output signal from the induction compass transmitter windings which sense the athwartships magnetic field component of the aircraft to compensate for turn induced errors due to the vertical field. Similarly, a DC compensating signal of magnitude M sin D sin $\theta$ is generated and combined with the demodulated output signal from those windings of the compass induction transmitter which sense the fore/aft component of the Earth's magnetic field. This compensating signal is combined with the demodulated output signal to compensate for any errors due to the vertical component of the Earth's magnetic field during climbs or dives. Sin $\phi$ and sin $\theta$ can easily be supplied from the aircraft vertical gyros and signals proportional to sin D may be readily set by means of a potentiometer or automatically programmed as a function of latitude and longitude. The apparatus illustrated in FIG. 3 can be easily adapted to an existing compass system that uses a synchro type output from the compass transmitter and thus may be utilized without affecting impedance matching between the transmitter and slaving system. Compensation of the output from the induction compass transmitter is external to the transmitter itself and is realized by combining the compensating signals with the demodulated output signals in the signal processing channel for the sensed athwartships and fore/aft components of the Earth's magnetic field respectively.

Thus, in FIG. 3, a "strapdown" compass transmitter is illustrated schematically at 30. Transmitter 30 includes an excitation winding 31 having a sinusoidal excitation voltage (commonly at 400 Hz) applied thereto to saturate a magnetic core structure twice during each excitation voltage cycle. A plurality of magnetometer sensing windings 32–34 are mounted on the magnetic core structure. Saturation of the core twice during each excitation voltage cycle results in the Earth's field inducing second harmonic voltages in these windings proportional to the magnitude of the Earth's field along the axes on which the windings are mounted. Windings 32, 33 and 34 are connected in a grounded Y or synchro configuration. Windings 32 and 33 sense the athwartships component A of the Earth's horizontal magnetic field and winding 34 sensed the fore/aft component F. The second harmonic, double sideband, carrier suppressed, output signals from compass transmitter 30 are supplied via leads 35–38 to a Scott-Tee transformer shown at 39. The Scott-Tee has a Y connected synchro type primary winding, not shown, to which the three phase signals from the induction compass transmitter are coupled. The secondary of the Scott-Tee transformer, also not shown, has a pair of orthogonally wound windings so that the three phase output signals from the synchro type induction compass transmitter are converted therein to produce a pair of output signals which are respectively representative of the sin $\psi$ and cos $\psi$ functions of the Earth's magnetic field H, i.e., the fore/aft and athwartships components of the field as sensed by the induction compass transmitter. Scott-Tee transformers are well-known devices for transforming either a two phase input to a three-phase output or, conversely, a three-phase input to a two-phase output as is the case in FIG. 3. Reference is hereby made to textbook "Alternating Current Machinery" — LV Dewley, MacMillan Co., N.Y. (1949) and particularly pages 89 through 91 thereof which describe the basic characteristics of the so-called Scott-Tee connection.

The output signals from Scott-Tee transformer 39 are therefore second harmonic, double sideband, carrier suppressed signals representative of the sine and cosine of the heading angle $\psi$ and therefore represent the Earth's field as sensed along the athwartships axis of the aircraft and along the fore/aft axis of the aircraft respectively. This signal, representative of the sine of the heading angle $\psi$, i.e., ~ H sin $\psi$ from induction transmitter is applied to a sin$\psi$ signal processing channel 40. The output from the Scott-Tee proportional to the cosine of the heading angle, (i.e., ~ H cos $\psi$) and therefore the field sensed along the fore/aft axis of the vehicle is applied to a cos $\psi$ signal processing channel shown generally at 41. The two signals are processed in the respective channels to produce demodulated, DC signals which are therefore representative respectively, of the Earth's magnetic field components sensed along these axes. The signal representative of the athwartships components includes errors due to the Earth's vertical field component as well as two cycle errors during any aircraft turns when the "strapdown" induction compass transmitter is tilted to the bank or roll angle $\phi$ of the aircraft. Similarly, the "strapdown" induction compass transmitter is tilted to the pitch angle $\theta$ during climbs or dives produces sensing errors in the windings of the induction compass transmitter due to these tilt angles. As pointed out previously, in connection with Equation (15) during turns the Earth's magnetic field as sensed along the fore/aft axis $F_\phi$ which is proportional to cosine of the heading angle, is not subject to errors induced by the vertical component of the Earth's magnetic field, nor does it include any two cycle error. It is only the component sensed along the athwartships axis, as shown by Equation (16), that is subject to vertical field and two cycle error during turns. Similarly, as may be seen from Equation (30) during non-turning climbs or dives, the signal representative of the Earth's field along the athwartships axis is not subject to errors due to the vertical component of the Earth's field nor is it subject to two cycle errors. Only fore/aft sensed signal, as shown in Equation 29 is subject to errors due to the vertical component of the Earth's field and two cycle error.

The second harmonic, double sideband, carrier suppressed signals at the output of Scott-Tee 39 are applied, respectively, through coupling capacitors 42 and 43 to amplifiers 44 and 45 in the respective processing channel. The amplified second harmonic signals are applied as one input to synchronous demodulators 46 and 47. A second harmonic carrier signal from local reference carrier signal source 48 is applied as the other input to synchronous demodulators 46 and 47. That is, if the excitation voltage for induction compass transmitter 30 is a 400 Hz alternating voltage, then the output signals are second harmonics of the excitation frequency (i.e., 800 Hz). By inserting a carrier at twice the excitation frequency, i.e., 800 Hz, demodulators 46 and 47 demodulate the signals to produce varying DC outputs that represent the variations of the Earth's magnetic field as sensed by the windings of the induction compass transmitter along the athwartships and fore/aft axes.

The output from demodulator 46 in sin $\psi$ channel 40 which represents the Earth's field sensed along the athwartships axis of the vehicle is processed to compensate for errors due to the Earth's vertical field during turns. The output from demodulator 47 in the cos $\psi$ channel 41 which measures the component of the Earth's magnetic field sensed along the fore/aft axis of the vehicle, is then processed to compensate the signal for errors due to the vertical component of the Earth's magnetic field during dives and climbs.

The output from the sin $\psi$ channel demodulator 46 is therefore applied to a summing network 49 in which the demodulated signal from the induction compass transmitter representative of the athwartships of the Earth's magnetic field is summed with the compensating signal from a vertical field compensation network shown generally at 50 which generated a DC compensating signal used to cancel the effects on the sin $\psi$ output signal of the vertical component of the Earth's magnetic field due to tilting of the induction compass transmitter sensing windings during turns. Compensating network 50 thus generates a signal proportional to M sin D sin $\phi$ and couples this signal to the other input of summing node 49 to add the DC compensating signal to the demodulated DC signal from the induction compass transmitter.

One input to network 50 is a varying DC input voltage from the vertical roll gyro which signal is proportional to the sine of the turn or bank angle $\phi$ and hence represents the bank or tilt of the compass transmitter during a turn. The signal from the roll gyro is applied to an amplifier 51 which produces an amplified sin $\phi$ signal and also introduces a scale factor representative of the Earth's magnetic field M so that the amplified output is proportional to M sin $\phi$. This amplified output is applied as the DC supply voltage for potentiometer 52 which has a movable wiper 53 which is controlled by a shaft 54. Wiper 53 is set by shaft 54 to insert sin D term. The voltage at wiper is therefore proportional to the product of the sine of the bank angle $\phi$ the Earth's magnetic field M and the sine of the dip angle D (i.e., $V_{53} = M \sin D \sin \phi$). Potentiometer wiper 53 may be set manually or alternatively, sin D may automatically be programmed as a function of the latitude and longitude. If the aircraft is to traverse a relatively small distance in latitude, so that the dip angle D remains relatively constant, potentiometer 52 may be adjusted initially by positioning the wiper so that for any given bank angle the output exactly cancels the vertical field error and no further adjustment is required. If the aircraft is likely to fly over a large distance so that the dip angle D changes substantially, changes in the wiper position by the pilot will be necessary to maintain proper compensation. Potentiometer 52 may be a linear potentiometer which has a sinusoidal scale calibration so that the wiper is adjusted to provide the required sin D adjustment. Alternatively, a sinusoidally wound potentiometer with a linear scale may be utilized instead.

The output from potentiometer wiper which is M sin D sin $\phi$ is applied to the other input of summing node 49. This signal which is equal to V sin $\phi$ or the error due to the vertical component of the Earth's field is thus added algebraically to the demodulated DC signal from the windings of the induction compass transmitter which sense the athwartships component of the Earth's field and as a result, error due to the vertical component of the Earth's field during turns is cancelled. The output from summing node 49 is therefore H sin $\psi$ cos $\phi$ and thus contains only the two cycle error due to the bank or tilt angle $\phi$. The corrected signal may be applied to the heading indicator system directly or may be remodulated for utilization in any suitable manner in a heading indicating or control system.

Simlarly, the output from demodulator 47 in the cos $\psi$ channel 41 which represents the component of the Earth's magnetic field sensed along the fore/aft axis of the aircraft, is processed to compensate the signal for errors due to the Earth's vertical field during climbs or dives. The output from demodulator 47 is therefore applied to summing network 55 in which the demodulated DC signal from the induction compass transmitter representing the cos $\psi$ or fore/aft signal is combined by summation with a compensating signal from a vertical field compensation network shown generally at 56 which generated a compensating signal which cancels the effects of the output signal from the compass transmitter of the vertical component of the Earth's magnetic field during climbs or dives. Compensating network 56 generates a signal proportional to M sin D sin $\theta$ and couples this signal to the other input of summing node 55. One input to network 56 is a varying DC input voltage from the vertical pitch gyro which is proportional to the sine of the pitch angle $\theta$ and hence, represents the pitch or tilt of the compass transmitter while climbing or diving. The signal from the gyro is applied to an operational amplifier 57 which produces an amplified sin $\theta$ signal. The amplified sin $\theta$ signal may also include a scale factor for the Earth's magnetic field M, i.e., M sin $\theta$ and is applied as the DC supply voltage for a potentiometer 58. Movable wiper 59 is also controlled by shaft 54 to the set position of wipers 59 to insert a sin D term. The voltage at wiper 59 is therefore proportional to the product of the sine of the pitch angle $\theta$, the Earth's magnetic field M and the sine of the dip angle, (i.e., $V_{59} = \sin D \sin \theta$). As pointed out in the description of the compensating channel 40, the potentiometer wipers may be set manually or automatically programmed as a function of latitude and longitude. Thus, depending on the distance to be traversed the sin D term may be set in the potentiometer and not changed throughout the whole voyage whereas if the vehicle is to cover a large distance and such a change in latitude so that the dip angle D changes substantially, changes in wiper position may be necessary to maintain proper compensation. Again, the potentiometer may be linear with the sinusoidal scale calibration or sinusoidally wound with a linear scale.

The voltage at potentiometer wiper 59 is supplied directly to the other input to summing node 55. The signal M sin D sin $\theta$ is equal to V sin $\theta$. V error due to the vertical component of the Earth's field is thus added algebraically to the demodulated DC signal from the induction compass transmitter windings which sense the fore/aft component of the Earth's magnetic field. As a result, the error due to the vertical component of the Earth's field is cancelled. The output from summing node 55 is therefore H cos $\psi$ cos $\theta$ and thus contains only the two cycle error due to the tilt or pitch angle $\theta$. This corrected signal representing the cos $\psi$ term may be applied to the heading indicator heading directly or demodulated for utilization in any suitable manner in a heading indicating or control system.

Figure 4:
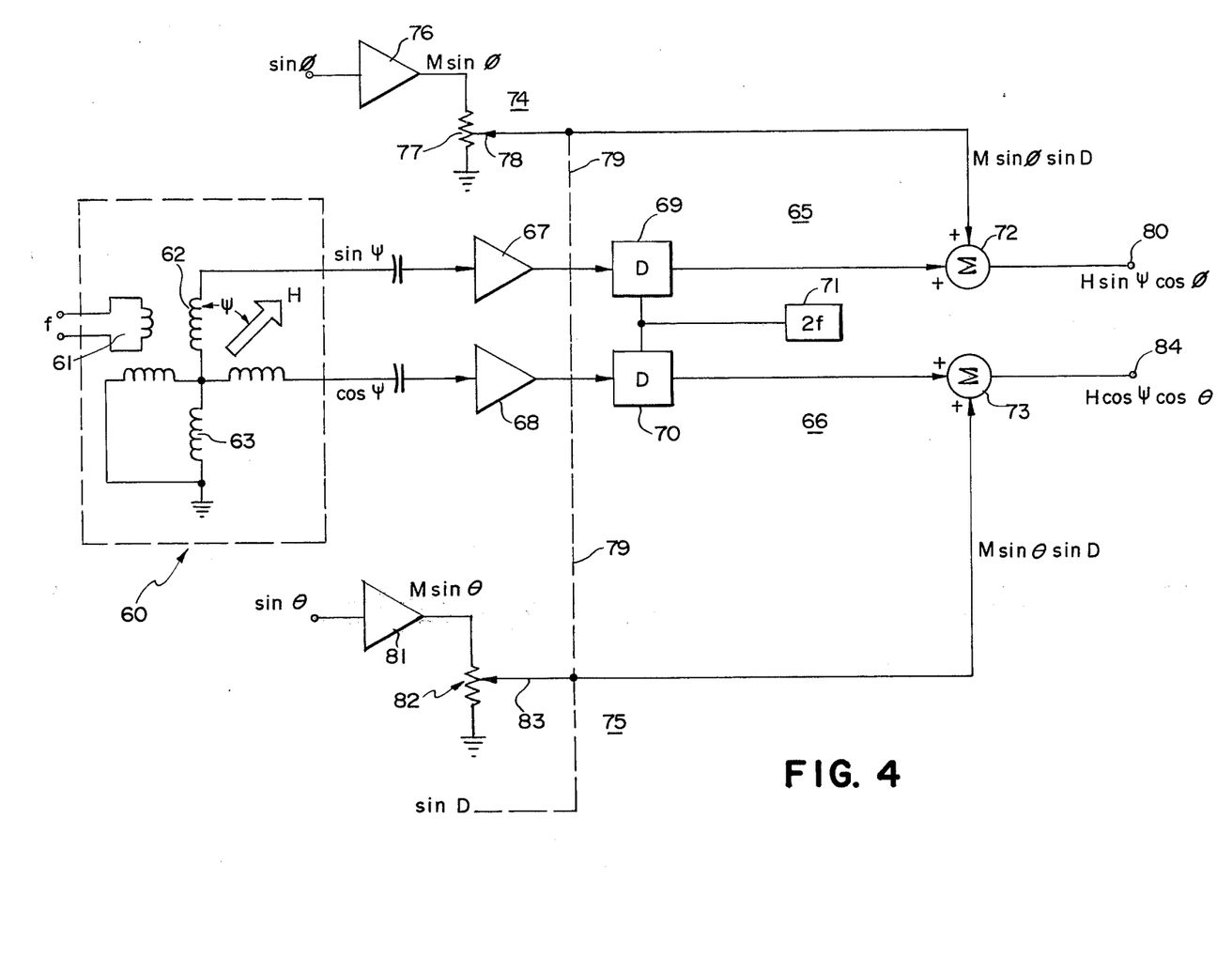
FIG. 4 is a partial illustration of an alternative embodiment in which compensation of for two cycle errors is also achieved in an external signal.

The compensated "strapdown" induction compass transmitter system shown in FIG. 3 was one in which the sensing windings are connected in a grounded Y or synchro configuration which require transformation through a Scott-Tee transformer or the like to produce output signals which are respectively proportional to the sine and cosine of the heading angle $\psi$, prior to demodulation and compensation. The synchro type of connection for induction compass transmitter is quite common so that the compensation arrangement illustrated in FIG. 3 is very useful and has applicability to existing systems. The instant invention is however, not limited thereto since it is equally applicable to induction compass transmitters using other winding configurations. FIG. 4 illustrated an arrangement in which an induction compass transmitter having a typical resolver winding configuration is compensated according to the instant invention. Because the sensing windings of the transmitter are connected in a resolver configuration, the output from the windings may be demodulated and compensated directly without requiring the use of Scott-Tee transformers or the like since the output from the sensing windings directly represent the components of the Earth's magnetic field sensed along the fore/aft and athwartships axis. That is, the output from the windings are directly proportional to $\sin \psi$ and $\cos \psi$. Thus, in FIG. 4, a "strapdown" induction compass transmitter of the resolver type is illustrated schematically at 60. Compass transmitter 60 includes an excitation winding 61. An alternating excitation voltage (commonly at 400 Hz) is applied thereto to saturate a magnetic core structure on which magnetometer sensing windings 62 and 63 are wound. The excitation voltage saturates the core twice during each excitation voltage cycle so that the Earth's magnetic field induces second harmonic voltages proportional to the fore/aft and athwartships components of the Earth's horizontal field in these windings. Windings 62 and 63 are connected in a typical resolver configuration so that winding 62 senses the fore/aft component F of the Earth's horizontal magnetic field H and the winding 63 senses the athwartships component A. The output from winding 63 is therefore proportional to the product of the horizontal component of the Earth's magnetic field H and the sine of the heading angle $\psi$ while the output from winding 62 is proportional to the product of the horizontal component H of the Earth's magnetic field and cosine of the heading angle $\psi$. The output from windings 62 and 63 are thus applied to signal processing channels 65 and 66 in which the signals are demodulated and thereafter compensated to cancel the effects of the vertical component of the Earth's magnetic field on the output of the transmitter during turns and while climbing or diving.

These second harmonic signals representing the fore-/aft and athwartships components of the Earth's magnetic field, i.e., are applied through suitable coupling capacitors and amplifiers 67 and 68 as one input to synchronous demodulators 69 and 70. The other input to each of the demodulators 69 and 70 is a second harmonic carrier signal from reference carrier signal source 71. By reinserting a carrier signal of twice the frequency of the excitation voltage applied to the transmitter, demodulators 69 and 70 demodulate the second harmonic carrier suppressed, double sideband signal from the transmitter windings to produce a varying DC output which represents the variations of the Earth's magnetic field as sensed by the windings of the compass transmitter.

The second harmonic reference carrier signal is again shown as being supplied from a separate source of carrier signal 71. It will be obvious, however, that the second harmonic carrier signal applied to demodulators 69 and 70 may be obtained directly from carrier excitation voltage source by multiplying a signal to produce the second harmonic reference carrier signal. The demodulated output signals from demodulators 69 and 70 are DC signals proportional respectively to the sensed athwartships and fore/aft components of the Earth's magnetic field. During a turn as pointed out previously, the horizontal component of the Earth's field as sensed athwartships is affected by the vertical component of the Earth's magnetic field which introduces errors proportional to $V \sin \phi$. Demodulated output signal from modulator 70 is a DC signal proportional to the sensed fore/aft component of the horizontal component of the Earth's magnetic field and is affected by the vertical component of the Earth's magnetic field during nonturning climbs and dives which introduces errors proportional to $V \sin \theta$.

The outputs from demodulators 69 and 70 are applied as one input to summing nodes 72 and 73. The other input to summing node 72 is a compensating signal proportional to $M \sin D \sin \phi$ from a vertical field turn compensating network shown generally at 74. The other input to summing node 73 is a compensating signal proportional to $M \sin V \sin \theta$ from a pitch compensating network shown generally at.

Network 74 generates a compensation signal which is used to cancel errors due to vertical components of the Earth's magnetic field due to tilting of the compass transmitter during turns. Network 75, on the other hand, generates a compensation signal which is used to cancel errors due to the vertical component of the Earth's magnetic field due to tilting of the compass transmitter during nonturning dives or climbs. Compensating network 74, as pointed out above, generates a signal equal to $M \sin D \sin \phi$ which is exactly equal to the turn induced vertical field error $V \sin \phi$ and is used to cancel the error due to the Earth's field component. One input to network 74 is a varying DC input voltage from the vertical roll gyro which is proportional to the sine of the roll or bank angle $\phi$ and hence represents the bank angle or tilt of the compass transmitter.

This signal from the roll gyro is applied to an amplifier 76 which amplifies the sin $\phi$ signal and introduces a scale factor equal to the Earth's magnetic field M. The amplified output from amplifier 76 is thus a signal proportional to the product of the Earth's magnetic field and the sine of the bank angle, i.e., $M \sin \phi$ and is applied as the DC supply voltage for potentiometer 77. A movable potentiometer wiper 78 is manually controlled by a shaft 79 to set the wiper and insert a sin D term. The voltage at wiper 78 is therefore equal to the product of the sin of the bank angle $\phi$, the Earth's magnetic field, M, and the sine of the dip angle D (i.e., $V_{78} = M \sin D \sin \phi$).

As pointed out previously, potentiometer wiper 78 may be set manually or may be automatically programmed as a function of latitude. In the case of small distances in which small or no variations of latitude are traversed, the position of the wiper may be preset. If the aircraft is to fly over a large distance and the dip angle changes substantially, changes in wiper position by the pilot may be necessary to maintain proper compensation. Furthermore, potentiometer may be linear with sinusoidal scale calibrations or it may be a sinusoidally long potentiometer with a linear scale.

The output from wiper 78 is applied as the other input to summing node 72 to cancel the vertical field error in the demodulated DC output from the sin $\psi$ signal processing channel of the compass transmitter. The compensated output signal from summing node 72 is then applied from output terminal 80 so that the compensated sin $\psi$ component may be applied to a heading indicator, control network or the like. That is, the demodulated compensated signals may be remodulated if desired and then applied to heading indicator or utilized for control purposes.

Pitch compensating network 75 generates a DC compensation signal which is equal to the vertical field error during non-turning climbs and dives and is proportional to V sin $\theta$. This compensating signal is applied to summing node 73 to compensate the sensed fore/aft component of the Earth's horizontal field. This network generates a singal proportional to M sin D sin $\theta$ which cancels vertical field error introduced during climbs and dives, i.e., it cancels the vertical field error term V sin $\theta$. One input to network 75 is a varying DC input voltage from the vertical pitch gyro which is proportional to the sine of the pitch angle $\theta$ and hence, represents the angle of tilt of the compass transmitter during a non-turning climb or dive. The DC signal from the vertical ptich gyro is applied to an amplifier 81 in which the sin $\theta$ signal is amplified and a scale factor proportional to the magnitude of the Earth's magnetic field M is introduced. The output from amplifier 81 is thus a signal proportional to M sin $\theta$ which is applied as a DC supply voltage to a potentiometer 82. A movable wiper 83 is manually controlled by common shaft 79 to set the position of the wiper and insert a sin D term. The voltage at wiper 83 is therefore the product of the sine of the pitch angle $\theta$, the Earth's magnetic field M and the sine of the dip angle D (i.e., $V_{83}$ = M sin D sin $\theta$). The voltage at potentiometer wiper 83 is applied as the other input to summing node 73 to cancel the vertical field error in the demodulated DC signal. The compensated output signal from summing node 74 is applied to an output terminal 84 where it may be applied to heading indicator or control network for utilization there. That is, the demodulated compensated signals may be remodulated and applied to heading indicator or utilized in whatever form is necessary for performing the function desired.

FIGS. 3 and 4 show arrangements for compensating the outputs from an induction compass transmitter to eliminate or cancel the effects of the vertical component of the Earth's magnetic field during turns and while climbing and diving. However, as pointed out previously, signals after compensation for vertical field error is still subject to two cycle error equivalent. That is, during turns, the horizontal component of the Earth's field H sin $\psi$ as sensed by the athwartships sensing windings still includes an error component proportional to the cosine of the bank angle; i.e., the sensed field is H sin $\psi$ cos $\phi$. In most instances, this error factor which is proportional to cos $\phi$ is small as compared to errors to the vertical field error which varies with the sin of the dip angle. However, in some circumstances, it is desirable to compensate the output signal from the induction compass transmitter to eliminate even the small two cycle error.

Figure 5:
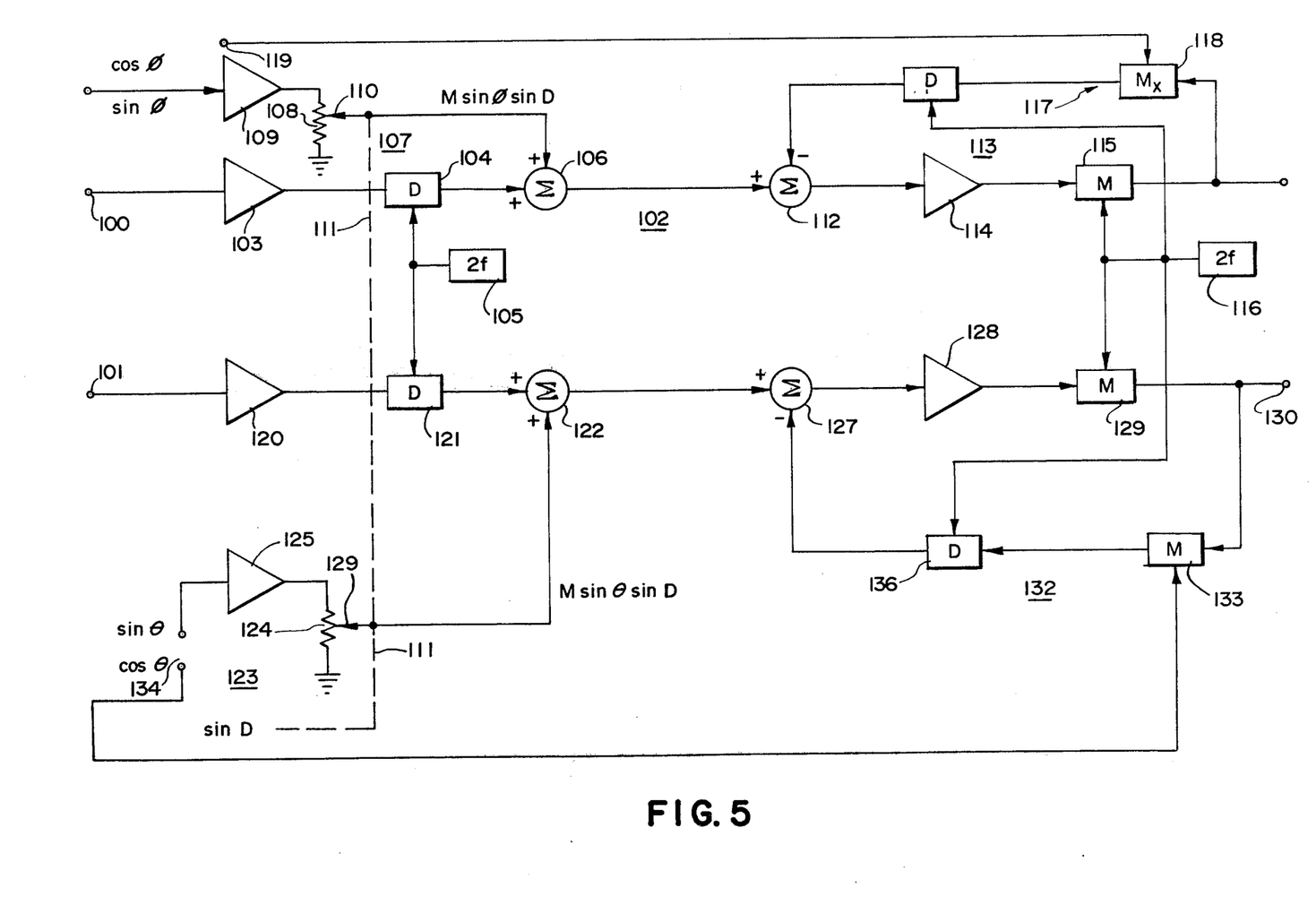
FIG. 5 illustrates an arrangement in which signals proportional to the athwarships and fore/aft components of the Earth's horizontal magnetic field sensed by the induction compass transmitter are initially compensated to eliminate the error component due to the Earth's vertical field both during turn, dives and climbs and are thereafter compensated to eliminate two cycle error.

FIG. 5 illustrates an arrangement in which the signals proportional to the athwartships and fore/aft components are sensed by the induction transmitters, are initially compensated to eliminate the error component due to the Earth's vertical field both during turns and during climbs and dives and are thereafter further compensated to eliminate two cycle error. In FIG. 5, the signal after being compensated for vertical field error is remodulated and compensated for two cycle error in a null balancing, closed loop, remodulating circuit. The remodulated signal is fed back in a negative feedback path to the input of the remodulating circuit. In the negative feedback, the signal is demodulated and also multiplied by two cycle compensation signals proportional to cos $\phi$ and cos $\theta$ respectively, to cancel two cycle error in the sin $\psi$ and cos $\psi$ channels respectively. The demodulated and compensated signals from the negative feedback paths are fed back to the inputs of the remodulating channels to be summed with the incoming DC signal which is used as the modulating signal in the remodulating channel. As a result, the closed loop remodulation circuits are driven until the outputs are modulated signals which are proportional respectively to H sin $\psi$ and H cos $\psi$ thereby eliminating both the vertical field and two cycle error.

The signals representing the Earth's field sensed by the induction compass transmitter windings along the fore/aft and athwartships axes of the vehicle are compensated for vertical field error, in the manner shown in either FIG. 3 or 4, i.e., by converting the output from a synchro type compass transmitter to the sin and cos signals through a Scott-Tee transformer or by utilizing a resolver type of induction compass sensing windings. Thus, two signals obtained from the transmitter not shown, are applied to input terminals 100 and 101 of vertical field and two cycle error and compensation networks to compensate both for the effect of the Earth's vertical field during turns and during climbs and dives and also for two cycle error. The signal representing the Earth's field as sensed by the transmitter windings along the athwartships axis of the vehicle are applied to input terminal 100. The signal is first demodulated and then processed to compensate for errors due to the Earth's vertical field during turns. Thereafter, this compensated demodulated DC signal is applied to a null balancing, closed loop remodulating network in which the signal is remodulated and fed back via a negative feedback loop to the input of the network. The negative feedback signal is further processed by multiplying the signal by a signal proportional to cos $\phi$ to cancel two cycle error.

The signal representing teh Earth's field as sensed by the induction compass transmitter windings along the fore/aft axis of the aircraft are applied to input terminal 101 and applied to a vertical field compensating signal processing network, in which the signal is demodulated and processed to compensate for errors due to the vertical component of the Earth's field during climbs and dives. This compensated DC signal is then applied to a null balancing, closed loop, remodulating network in which the signal is remodulated and fed back through a negative feedback loop to the input of the network. The negative feedback signal is processed by multiplying the signal by the compensating signal proportional to cos $\theta$ to cancel two cycle error introduced into the fore/aft sensed field during climbs and dives.

The signals from the compass transmitter representing the Earth's horizontal field sensed along the athwartships axis of the vehicle is impressed on input terminal 100. It is thereafter applied to signal processing channel 102 after suitable amplification in amplifier 103 as one input to a demodulator 104. The second harmonic, double sideband, carrier suppressed signal is demodulated in demodulator 104. To this end, a second harmonic carrier signal from carrier signal source 105 which is applied as the other input to the demodulator. The output from demodulator 104 is therefore a varying DC voltage which is proportional to horizontal component of the Earth's field as sensed along the athwartships axis of the vehicle. This signal as pointed out previously, includes an error term equal to V sin $\phi$ during turns. This latter error factor represents the error induced into the vertical by the vertical component of the Earth's field during turns. The demodulated signal is therefore compensated for vertical field error by applying the demodulated signal as one input to a summing node 106 where it is combined with a compensating signal from the vertical field compensating network 107. This compensating signal cancels the vertical field error term V sin $\phi$. Compensating network 107 generated, as described previously in connection with FIGS. 3 and 4, a signal proportional to M sin D sin $\phi$ which is equal to the vertical field error V sin $\phi$. Vertical field compensating network 107, in a manner similar to that described previously in connection with FIGS. 3 and 4, include a potentiometer 108. The supply voltage to potentiometer 108 is from the output of amplifier 109 and is proportional to M sin $\phi$. The input to amplifier 109 is a signal from the vertical roll gyro which is proportional to the sine of the bank or tilt angle, i.e., sin $\phi$. Amplifier 109 not only amplifies the sin $\phi$ signal but also introduces a scaling factor proportional to the magnitude of the Earth's field so that output from amplifier 108 is equal to M sin $\phi$. Potentiometer 109 has a movable wiper 110 that is controlled through shaft 111. Shaft 111 moves wiper 110 so that a sin D term is inserted. The voltage at wiper 110 is therefore proportional to the product of the sine of the bank angle $\phi$, the Earth's magnetic field M and the sine of the dip angle D, (i.e., $V_{110}$ = M sin V sin $\phi$). This voltage at wiper 110 is therefore equal to the error introduced by the vertical component of the Earth's magnetic field, i.e., V sin $\phi$ and is applied as the other input to summing node 106. The output signal from summing node 106 is therefore a signal which has been compensated for vertical field errors. In other words, the output of summing node 106 is a DC signal proportional to H sin $\psi$ cos $\phi$. Thus, while the DC output signal from summing node 106 is a signal proportional to the Earth's magnetic field sensed along the athwartships axis of the vehicle, it does include a two cycle error proportional to cos $\phi$ due to banking or tilting of the vehicle on which the compass transmitter is mounted during turns.

The output signal from summing node 106 which now includes only a two cycle error is applied to summing node 112 at the input of a close loop remodulating network 113 in which the signal is remodulated and the two cycle error proportional to cos $\phi$ is eliminated. Remodulating network 113 consists generally of a modulation path in which the varying DC output signal from summing node 112, which is a DC voltage proportional to sin $\psi$ cos $\phi$ is remodulated. The output of node 112 is applied to amplifier 114. The amplified output signal is supplied to modulator 115 the other input to which is from a reference carrier source 116 which may be a second harmonic of the transmitter excitation frequency. The output of modulator 115 may thus be a double sideband, carrier suppressed, second harmonic signal proportional to H sin $\psi$ cos $\phi$. This remodulated signal is applied to an output terminal and is also coupled to a negative feedback path 117 in which the second harmonic, modulated signal is corrected to compensate for cos $\phi$ to eliminate two cycle error. The signal compensated for two cycle error is also demodulated in negative feedback path 117 to provide a varying DC signal proportional to the corrected signal. This signal is applied as the second input to summing node 112 to allow the Remodulating Network to produce a modulated output signal at null balance condition which is H sin $\psi$.

The signal from modulator 115 is applied as one input to a multiplier 118 in negative feedback path 117. The other input to multiplier 118 is a signal from the vertical roll gyro terminal 119 which is proportional to cos $\phi$. The output from multiplier 118 is therefore a second harmonic, double sideband, carrier suppressed signal which is now reduced in magnitude since cos $\phi$ < 1. By By reducing the negative feedback (sin cos $\phi$ < 1), the output from the closed loop is correspondingly increased thereby cancelling the cos $\phi$ error term in the output from the athwartships sensing windings.

In any closed loop with negative feedback, the transfer function (output/input) (C/R) is a function of the loop gain G and the negative feedback H. Thus, (C/R) = (G/1+GH). If G $\gg$ 1, which is the case if the amplifier gain is large, then GH $\gg$ 1 and the transfer function becomes:

$$(C/R) = (1/H) \text{ (i.e., } (C/R) = (G/GH) = (1/H)).$$

If the negative feedback is reduced by the factor cos $\phi$ and cos $\phi$ < 1, a condition that exists if the plane is not in level flight since $\phi$ — 0° and cos $\phi$ = 1 only in level flight. For any angle of bank cos $\phi$ < 1. Since the transfer function is inversely proportional to negative feedback H, reduction of H by multiplying by cos $\phi$ which is < 1, obviously results in increasing cos $\phi$ by a corresponding cos $\phi$ factor thereby cancelling two cycle error.

The output of multiplier 118 is a modulated signal which is proportional to H sin $\psi$.. This signal is applied as one input to synchronous demodulator 119 in the negative feedback path. The other input to demodulator 119 is a second harmonic carrier signal from carrier signal source 116. This carrier signal is reinserted to demodulate the compensated, second harmonic, double sideband carrier to produce a varying DC voltage at the output of demodulator 119 which is proportional to H sin $\psi$. This DC signal is the other input to summing node 112. When output from summing node 112 is at the null balance condition then the output of modulator 115 in a second harmonic, double sideband modulated signal which is proportional to H sin $\psi$. Therefore, the signal at the output terminal is proportional to the Earth's magnetic field as sensed by the induction compass transmitter windings along the athwartships axis with errors due to the vertical component of the Earth's field and two cycle errors eliminated.

Similarly, the component of the Earth's magnetic field as sensed by the winding of the transmitters along the fore/aft axis, i.e., proportional to H cos $\psi$, are compensated to eliminate errors due to the vertical components of the Earth's field during turns, climbs and dives and to eliminate two cycle errors. Thus, the incoming signal at terminal 101 is amplified in amplifier 120 and applied to demodulator 121. This second harmonic carrier signal from carrier signal source 105 is applied to demodulator 121 which synchronously demodulates the suppressed carrier, double sideband signal to produce a varying DC voltage which is proportional to the horizontal component of the Earth's field as sensed along the fore/aft axis of the vehicle. This signal, as pointed out previously, is equal to the H cos $\psi$ cos $\theta$ − V sin $\theta$. The latter term, of course, represents the error introduced by the vertical component of the Earth's magnetic field during climbs and dives.

The output of demodulator 121 is applied as one input to summing node 122 and is summed with a compensating signal from a vertical field compensation network shown generally at 123. This compensating signal has a magnitude such that it cancels the vertical field error term V sin $\theta$. Compensating network 123 generated a signal proportional to M sin D sin $\theta$ which exactly equals the vertical field error V sin $\theta$. Network 123, in a manner similar to that described in connection with channel 102 includes a potentiometer 124 which has a voltage supplied thereto from an amplifier 125 which is proportional to M sin $\theta$. The input signal to amplifier 125 is a signal from the vertical pitch gyro which is proportional to the pitch angle during climbs and dives, i.e., sin $\theta$. Amplifier 124 not only amplifies the sin $\theta$ signal but introduces a scaling factor proportional to the magnitude of the Earth's magnetic field M so that the output from amplifiers equal to M sin $\theta$ Potentiometer 124 has a movable wiper 126 which is controlled by common shaft 111 to insert a sin D term. The voltage at wiper 126 is therefore proportional to the product of the sine of the pitch angle $\theta$, the Earth's magnetic field M and the sine of the dip angle D, (i.e., $V_{126}$ = M sin D sin −). This signal which is therefore equal to the error due to the vertical component of the Earth's magnetic field. This signal is impressed as the other input to summing node 121 so that the output from summing node 122 is a DC signal which has been compensated for vertical field errors. In other words, the output of summing node 122 is a DC signal proportional to H sin $\psi$ cos $\theta$.

This signal which, however, does include a two cycle error term proportional to cos $\theta$ is applied as one input to a summing node 127 at the input to a closed loop remodulating network 128 in which the signal is remodulated and the two cycle error due to cos $\theta$ is eliminated. Remodulating network 128 consists of a remodulating path in which the DC voltage proportional to H sin $\psi$ cos $\theta$ from node 127 is amplified in amplifier 128 and applied as one input to modulator 129, the other input to which is from reference carrier source 116. The carrier which may be second harmonic of the transmitter excitation voltage frequency is remodulated and applied to an output terminal 130 and is also applied to a negative feedback path 132 in which the modulated signal is corrected to compensate for cos $\theta$ to eliminate two cycle error. The compensated negative feedback signal is demodulated in feedback path 132 and the demodulated DC signal is applied to summing node to drive the closed loop network to produce a modulated output signal at null balance which is proportional to H cos $\psi$. That is, corrected for two cycle error as well as vertical field error. The output from modulator 129 is applied as one input to a multiplier 133 in the negative feedback path. The other input to multiplier 133 is a signal from the vertical pitch gyro terminal which is proportional to cos $\theta$. The output from multiplier 134 is therefore a second harmonic, double sideband, carrier suppressed signal which is now proportional to H cos $\psi$. By reducing the negative feedback by cos $\theta$ (since cos $\theta$ <1) the output from the closed loop is correspondingly increased, thereby cancelling the cos $\theta$ error term in output from the fore/aft sensing windings. The compensated signal from multiplier 133 is applied as one input to a demodulator 136 in the negative feedback loop, the other input to which is a second harmonic carrier signal from the carrier source 116. The output from demodulator 136 is a DC voltage proportional to H cos $\psi$. At zero or null condition, the output of modulator 129 and at terminal 130 is a modulated signal which is proportional to H cos $\psi$. Therefore, the output signal at terminal 130 is proportional to the Earth's field as sensed by the compass transmitter windings along the fore/aft axis with errors due to the vertical component of the Earth's field as well as two cycle error eliminated.

From the foregoing description, it can be seen that vertical field induced errors during turns as well as during non-turning climbs and dives have been eliminated. Furthermore, if desired, two cycle errors due to these various maneuvers may be eliminated also by further processing of the signal after initial compensation for vertical field errors.

In the arrangements illustrated in FIGS. 3, 4 and 5, and exact compensation signal, i.e., M sin D sin $\phi$ or sin $\theta$ is generated by obtaining a signal proportional to the sine of the tilt angle during turns and during climbs and dives from the vertical roll or vertical pitch gyro which form part of an aircraft system. For some applications, however, compensation will be sufficiently accurate if a linear function of the bank angle $\theta$ or the pitch angle $\theta$ is used in place of the geometric function. This approximation becomes quite accurate as the bank angle or the pitch angle becomes small which automatically occurs when the aircraft is levelling out on a desired heading after turn or after climb or dive. Similarly, in correcting two cycle errors, a compensating signal equal either to cos $\phi$ or cos $\theta$ is utilized to cancel the two cycle error. For some applications, the angle itself rather than the trigonometric function thereof may be used with equal facility. Hence, it will be understood and appreciated that the instant invention is not limited to an arrangement in which sompensation for the vertical field errors or two cycle errors is achieved by utilizing a signal which is a trigonometric function of either the bank or pitch angles but that the pitch or bank angles may be utilized directly.

It will be seen therefore that applicant has provided an arrangement and method for compensating a "strapdown" induction compass transmitter in the signal processing channels associated with the output of the transmitter to eliminate the effects of vertical field error and two cycle errors to eliminate turning instabilities such as northerly turning error.

While a number of specific embodiments of this invention have been shown and described above, it will, of course, be understood that the invention is not limited thereto since many modifications both as to the circuit arrangement and the instrumentalities employed therein may be made. It is contemplated by the appended claims to cover any such modifications which fall within the true spirit and scope of this invention.

What is claimed as new and desired to be secured by Letters Patent of the United States is:

1. In a strapdown induction compass transmitter compensated for errors due to the Earth's vertical field during turns and during climbing and diving maneuvers, comprising:
   (a) magnetic sensing means for producing modulated signals proportional to the strength of the Earth's magnetic field along the fore/aft and athwartships axes,
   (b) means to demodulate the modulated signal representative of the sensed fore/aft field to produce a varying DC signal which is proportional to the sensed Earth's field and thus to the cosine of the magnetic heading angle $\psi$,
   (c) means to demodulate the modulated signal representative of the sensed athwartships field to produce a varying DC signal which is proportional to the sensed Earth's field and thus to the sine of the magnetic angle $\psi$,
   (d) means to compensate said demodulated signals for errors due to the Earth's vertical field during turns, including;
      (1) means to generate a first DC correction signal proportional to the product of the Earth's magnetic field M, the sine of the magnetic dip angle D, and the sine of the bank angle $\phi$,
      (2) means to generate a second DC correction signal proportional to the product of the Earth's magnetic field M, the sine of the magnetic dip angle D, and the sine of the pitch angle $\theta$,
      (3) means to add said first correction signal algebraically to the demodulated DC signal representing the product of the Earth's magnetic field and the sine of the magnetic heading angle $\psi$, and
      (4) means to add said second DC correction signal algebraically to the demodulated DC signal representing the product of the Earth's magnetic field and the cosine of the magnetic heading angle $\psi$, to cancel the signal component due to the Earth's vertical field sensed along the athwartships axis during turns and along the fore/aft axis during climbing and diving maneuvers.

2. The strapdown induction compass transmitter according to claim 1 wherein said magnetic sensing means produces a three phase out representative of the field sensed along the respective axes and includes means for converting the three phase output from said sensing means to a pair of signals representative of the product of the field and the sine and cosine of the magnetic heading angle $\psi$ respectively.

3. The strapdown induction compass transmitter according to claim 2 wherein said means for converting includes a Scott-Tee Transformer having a three phase input to which the three phase signals from the magnetic sensing means are coupled and a two phase output coupled said demodulating means.

4. The strapdown induction compass transmitter according to claim 1 including further means to compensate for two cycle error, comprising,
   (a) first and second closed loop, null balanced, modulating means, each of said modulating means having an input and an output including a negative feedback path from its output to its input,
   (b) demodulating means in each of said negative feedback paths,
   (c) means to couple the compensated sin $\psi$ and cos $\psi$ DC signals to said first and second modulating means respectively,
   (d) means to reduce the negative feedback in the path associated with said first modulating means by a factor proportional to the cosine of the bank angle $\phi$ whereby the output signal from said first modulating means is increased correspondingly to cancel two cycle error during turns,
   (e) means to reduce the negative feedback in the path associated with said second modulating means by a factor proportional to the cosine of pitch angle $\theta$ whereby the output signal from said second modulating means is increased correspondingly to cancel two cycle error during climbing and diving maneuvers.

5. The strapdown compass transmitter according to claim 4 wherein the means to reduce the negative feedback in the paths includes;
   (a) multiplying means in each of said paths,
   (b) means to apply the output signal from said first modulating means, and a signal proportional to the cosine of the bank angle $\phi$ to the multiplying means in the negative feedback path associated with said first modulating means,
   (c) means to apply the output signal from said second modulating means and a signal proportional to the cosine of the pitch angle $\theta$ to the multiplying means in the negative feedback path associated with said second modulating means.

* * * * *